United States Patent
Zhou et al.

(10) Patent No.: US 12,243,282 B2
(45) Date of Patent: Mar. 4, 2025

(54) METHOD AND APPARATUS FOR DETERMINING A DEPTH VALUE OF HAND POSTURE THAT INVOLVES ACQUIRING A HAND DEPTH IMAGE MAP AND IMAGE INFORMATION FEATURE MAP IS UP-SAMPLED TO OBTAIN RESOLUTION FEATURE MAP, AND NON TRANSITORY COMPUTER-READABLE STORAGE MEDIUM

(71) Applicant: GUANGDONG OPPO MOBILE TELECOMMUNICATIONS CORP., LTD., Dongguan (CN)

(72) Inventors: Yang Zhou, Palo Alto, CA (US); Jie Liu, Palo Alto, CA (US)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 415 days.

(21) Appl. No.: 17/748,657

(22) Filed: May 19, 2022

(65) Prior Publication Data
US 2022/0277580 A1    Sep. 1, 2022

Related U.S. Application Data

(63) Continuation of application No. PCT/CN2020/128281, filed on Nov. 12, 2020.
(Continued)

(51) Int. Cl.
*G06V 40/10*    (2022.01)
*G06T 3/4046*    (2024.01)
(Continued)

(52) U.S. Cl.
CPC ............ *G06V 10/25* (2022.01); *G06T 3/4046* (2013.01); *G06T 7/50* (2017.01); *G06T 7/73* (2017.01);
(Continued)

(58) Field of Classification Search
None
See application file for complete search history.

(56) References Cited

U.S. PATENT DOCUMENTS

| | | | |
|---|---|---|---|
| 8,971,588 B2* | 3/2015 | Abramovich | G06V 40/1312 382/116 |
| 2009/0322477 A1* | 12/2009 | Celorio | G07C 9/257 340/5.82 |

(Continued)

FOREIGN PATENT DOCUMENTS

| | | |
|---|---|---|
| CN | 104049738 A | 9/2014 |
| CN | 106055091 A | 10/2016 |

(Continued)

OTHER PUBLICATIONS

International Search Report and Written Opinion dated Feb. 3, 2021 in International Application No. PCT/CN2020/128281. English translation attached.

*Primary Examiner* — Haris Sabah
(74) *Attorney, Agent, or Firm* — Sheppard, Mullin, Richter & Hampton LLP

(57) ABSTRACT

Provided are a hand pose estimation method and apparatus, and a storage medium in embodiments of the present disclosure disclose. The method includes: obtaining a feature map corresponding to a hand depth image; inputting the feature map into an image feature extraction network to obtain an image information set feature map corresponding to the hand depth image; up-sampling the image information set feature map to obtain a target resolution feature map; inputting the target resolution feature map into a predeter-
(Continued)

mined depth classification network to obtain depth maps corresponding to hand key points in the hand depth image, wherein the predetermined depth classification network is configured to distinguish hand key points of different depths; and determining, based on the depth maps, depth values corresponding to the hand key points to perform hand pose estimation.

19 Claims, 10 Drawing Sheets

Related U.S. Application Data

(60) Provisional application No. 62/938,243, filed on Nov. 20, 2019.

(51) Int. Cl.
*G06T 7/50* (2017.01)
*G06T 7/73* (2017.01)
*G06V 10/25* (2022.01)
*G06V 10/46* (2022.01)
*G06V 10/82* (2022.01)
*G06V 10/80* (2022.01)

(52) U.S. Cl.
CPC ............ *G06V 10/462* (2022.01); *G06V 10/82* (2022.01); *G06V 40/11* (2022.01); *G06T 2207/10028* (2013.01); *G06T 2207/20084* (2013.01); *G06V 10/803* (2022.01)

(56) References Cited

U.S. PATENT DOCUMENTS

| | | | |
|---|---|---|---|
| 2011/0080336 A1* | 4/2011 | Leyvand | G06F 3/017 382/103 |
| 2015/0248582 A1* | 9/2015 | Ryu | H04N 5/33 382/103 |
| 2020/0112713 A1* | 4/2020 | Li | H04N 13/254 |

FOREIGN PATENT DOCUMENTS

| | | | |
|---|---|---|---|
| CN | 106648103 A | 5/2017 | |
| CN | 107066935 A | 8/2017 | |
| CN | 108594997 A | 9/2018 | |
| CN | 109800676 A | 5/2019 | |
| CN | 109934111 A | 6/2019 | |

* cited by examiner 0.999884

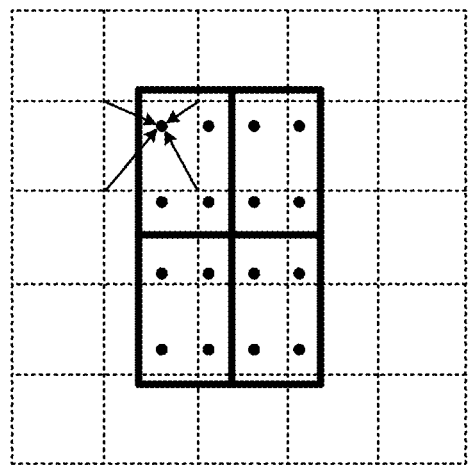
FIG. 6
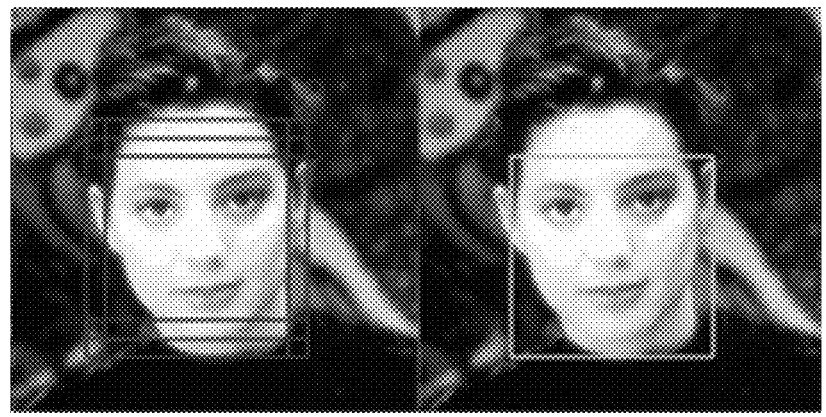
FIG. 7
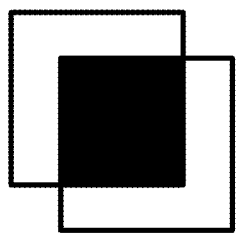 
FIG. 8a              FIG. 8b

METHOD AND APPARATUS FOR DETERMINING A DEPTH VALUE OF HAND POSTURE THAT INVOLVES ACQUIRING A HAND DEPTH IMAGE MAP AND IMAGE INFORMATION FEATURE MAP IS UP-SAMPLED TO OBTAIN RESOLUTION FEATURE MAP, AND NON TRANSITORY COMPUTER-READABLE STORAGE MEDIUM

CROSS-REFERENCE TO RELATED APPLICATION

This application is a continuation of International Application No. PCT/CN2020/128281, filed on Nov. 12, 2020, which claims a priority to a prior U.S. provisional patent application No. 62/938,243, filed on Nov. 20, 2019, and entitled "COMPACT SEGMENTATION HEAD FOR DEPTH ESTIMATION OF 3D HAND POSE ESTIMATION FOR A MOBILE TOF CAMERA". The disclosures of the aforementioned applications are hereby incorporated by reference in their entireties.

TECHNICAL FIELD

Embodiments of the present disclosure relate to the technical field of image processing technologies, and more particularly, to a hand pose estimation method and apparatus, and a computer storage medium.

BACKGROUND

The ability to accurately and efficiently reconstruct the motion of the human hand from images promises exciting new applications in immersive virtual and augmented realities, robotic control, and sign language recognition, constantly producing exciting new applications related to gesture estimation. In particular, the successful development of depth cameras in recent years has led to greater progress in reconstructing hand motions.

However, due to unconstrained global and local pose variations, frequent occlusion, local self-similarity, and a high degree of articulation, it remains a challenging task to perform hand pose estimation in a more accurate manner.

SUMMARY

The present disclosure provides a hand pose estimation method and apparatus, and a computer storage medium, capable of accurately and efficiently performing hand pose depth estimation, thereby achieving a high-precision hand pose estimation.

Technical solutions of the present disclosure may be implemented as follows.

In a first aspect, embodiments of the present disclosure provide a hand pose estimation method. The method includes: obtaining a feature map corresponding to a hand depth image; inputting the feature map into an image feature extraction network to obtain an image information set feature map corresponding to the hand depth image; up-sampling the image information set feature map to obtain a target resolution feature map; inputting the target resolution feature map into a predetermined depth classification network to obtain depth maps corresponding to hand key points in the hand depth image, wherein the predetermined depth classification network is configured to distinguish hand key points of different depths; and determining, based on the depth maps, depth values corresponding to the hand key points to perform hand pose estimation.

In a second aspect, the embodiments of the present disclosure provide a hand pose estimation apparatus. The hand pose estimation apparatus includes: an obtaining part configured to obtain a feature map corresponding to a hand depth image; a feature extraction part configured to input the feature map into an image feature extraction network to obtain an image information set feature map corresponding to the hand depth image; an up-sampling part configured to up-sample the image information set feature map to obtain a target resolution feature map; a classification part configured to input the target resolution feature map into a predetermined depth classification network to obtain depth maps corresponding to hand key points in the hand depth image, wherein the predetermined depth classification network is configured to distinguish the hand key points of different depths; and a determining part configured to determine depth values corresponding to the hand key points based on the depth maps to perform hand pose estimation.

In a third aspect, the embodiments of the present disclosure provide a hand pose estimation apparatus including a processor, and a memory having instructions stored thereon and executable by the processor. The instructions, when executed by the processor, perform the hand pose estimation method as described above.

In a fourth aspect, the embodiments of the present disclosure provide a computer storage medium having a program stored thereon and applied in a hand pose estimation apparatus. The program, when executed by a processor, performs the hand pose estimation method as described above.

In the hand pose estimation method provided by the embodiments of the present disclosure, a hand pose estimation apparatus can: obtain a feature map corresponding to a hand depth image; input the feature map into an image feature extraction network to obtain an image information set feature map corresponding to the hand depth image; up-sample the image information set feature map to obtain a target resolution feature map; input the target resolution feature map into a predetermined depth classification network to obtain depth maps corresponding to hand key points in the hand depth image, in which the predetermined depth classification network is configured to distinguish the hand key points of different depths; and determine, based on the depth maps, depth values corresponding to the hand key points to perform hand pose estimation. Thus, in the present disclosure, after the hand feature map is obtained, the hand pose estimation apparatus can obtain deeper image information and increase an image resolution through the feature extraction and the image up-sampling processing, and the hand pose estimation apparatus can input the obtained target resolution feature map into the predetermined depth classification network to obtain the depth maps corresponding to the hand key points. That is, the hand key points are classified based on the depth intervals, and thus the depth values corresponding to the hand key points can be determined based on the depth maps, thereby achieving the hand pose estimation based on the depth values. It can be seen that, the hand pose estimation apparatus of the present disclosure can perform an accurate and efficient hand pose depth estimation, thereby achieving the high-precision hand pose estimation.

BRIEF DESCRIPTION OF DRAWINGS

FIG. 6 is a schematic diagram of a bilinear interpolation effect of ROIAlign in the related art.

FIG. 7 is a schematic diagram illustrating an effect of Non-Maximum Suppression (NMS) in the related art.

FIG. 8a and FIG. 8b are schematic diagrams of a union and an intersection in the related art.

DESCRIPTION OF EMBODIMENTS

In order to describe features and technical contents of the embodiments of the present disclosure as thoroughly as possible, implementations of the embodiments of the present disclosure will be described in detail below with reference to the accompanying drawings. The accompanying drawings are only used for reference and description, but are not intended to limit the embodiments of the present disclosure.

Owing to the ability to accurately estimate three-dimensional coordinate positions of skeleton nodes of the human hand from an image for accurately and effectively reconstructing motions of the human hand from the image, the gesture estimation is widely used in fields such as immersive virtual reality and augmented reality, robot control, and sign language recognition, and it has become a focus in the field of computer vision and human-computer interaction. With the rise and development of commercial, inexpensive depth cameras, the hand pose estimation has made huge progress.

In particular, the successful development of depth cameras in recent years has led to greater progress in reconstructing motions of the hand. Here, the depth cameras include structured light cameras, laser scanning cameras, TOF cameras, etc. Herein, the widely applied TOF cameras are currently adopted. Three-dimensional (3D) imaging of TOF techniques is to continuously transmit light pulses to an object, and then uses a sensor to receive light returned from the object, and obtain a target distance of the object by detecting flight (round-trip) time of the light pulse. That is, a TOF camera is a range imaging camera system, in which TOF method is adopted to calculate a distance between the TOF camera and the captured object for each point of the image by measuring the round trip time of an artificial light signal provided by a laser or a Light-Emitting Diode (LED).

Figure 1:
FIG. 1 is a schematic diagram of an image captured by a Time of Fight (TOF) camera in the related art.

Specifically, the TOF camera can output an image with a size H×W, and each pixel value on the Two-Dimensional (2D) image may represent a depth value of the pixel. The pixel value ranges from 0 millimeter (mm) to 3,000 mm. FIG. 1 is a schematic diagram of an image captured by a TOF camera in the related art. A captured image including a hand is illustrated in FIG. 1.

It should be noted that, in the embodiments of the present disclosure, an image captured by the TOF camera is referred to as a depth image.

Further, target detection can be performed on the depth image captured by the TOF camera. Assuming that a target is a human hand, an input of hand detection is the depth image illustrated in FIG. 1, and an output thereof can be a probability of hand presence (e.g., a numerical number ranging from 0 to 1, a larger value indicating a greater confidence of the hand presence) in the depth map and a hand bounding box (i.e., a bounding box representing a position and a size of the hand). Herein, the bounding box is a boundary frame. The bounding box can be represented as (xmin, ymin, xmax, ymax), where (xmin, ymin) represents the upper left corner of the bounding box, and (xmax, ymax) represents the lower right corner of the bounding box.

Figure 2:
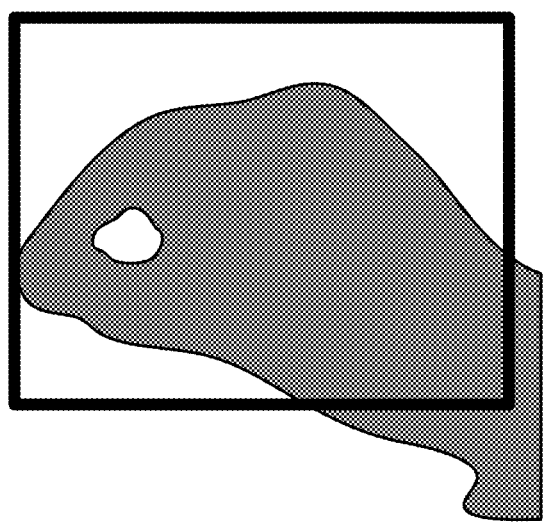
FIG. 2 is a schematic diagram of a detection result of a hand bounding box in the related art.

As an example, FIG. 2 is a schematic diagram of a detection result of a hand bounding box in the related art. As illustrated in FIG. 2, the black rectangular box is the hand bounding box, and the score of the hand bounding box is as high as 0.999884, i.e., the confidence of hand presence in the depth map is as high as 0.999884.

Figure 3:
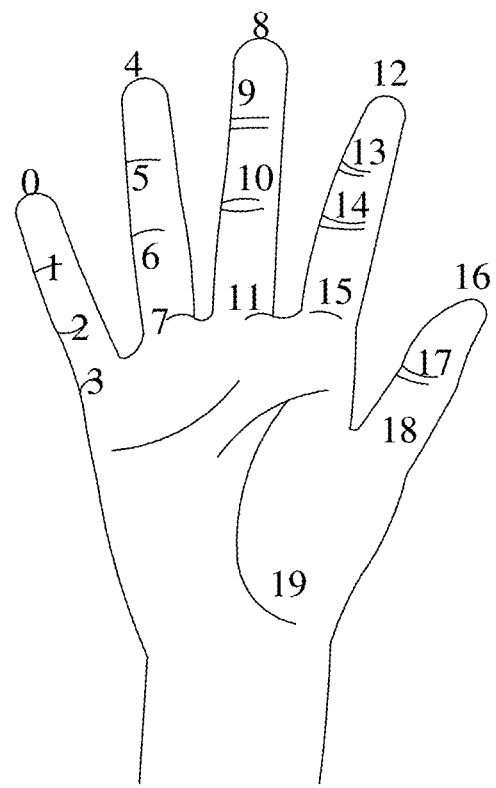
FIG. 3 is a schematic diagram of key point positions of hand skeleton in the related art.
Figure 4:
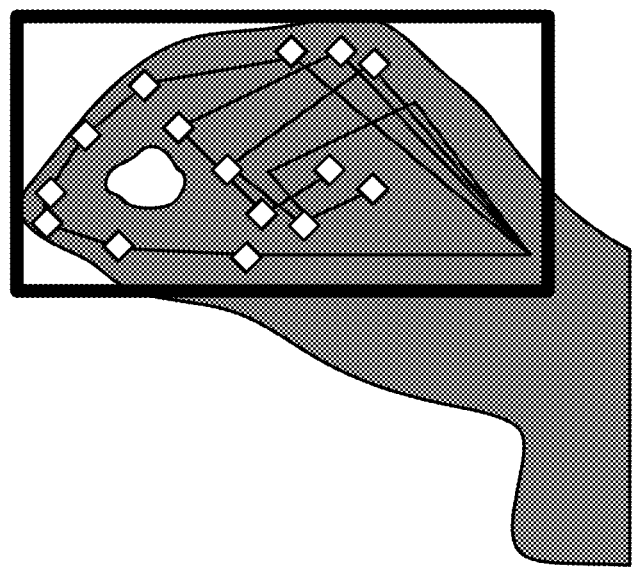
FIG. 4 is a schematic diagram of a two-dimensional hand pose estimation result in the related art.

Further, on the one hand, a two-dimensional hand pose estimation can be continued based on a result of the target detection. Specifically, two-dimensional key point positions of the hand skeleton are outputted. FIG. 3 is a schematic diagram of key point positions of hand skeleton in the related art. As illustrated in FIG. 3, the hand skeleton is provided with 20 key points, and 20 key point positions are illustrated as 0 to 19 in FIG. 3. Each key point position can be represented by 2D coordinate information (x, y). A two-dimensional hand pose estimation result can be generated subsequent to the determination of the coordinate information of the 20 key points. As an example, on basis of two-dimensional coordinates of the hand key points illustrated in FIG. 3, FIG. 4 is a schematic diagram of a two-dimensional hand pose estimation result in the related art.

On the other hand, three-dimensional hand pose estimation can also be continued based on the result of the target detection. Specifically, three-dimensional key point positions of the hand skeleton are outputted, and the key point positions of the hand skeleton are also as illustrated in FIG. 3. Here, each key point position can be represented by 3D coordinate information (x, y, z), where z is coordinate information in a depth direction.

At present, a typical hand pose detection procedure may include a hand detection process and a hand pose estimation process. The hand detection process may include a backbone feature extractor and a bounding box detection head module. The hand pose estimation process may include a backbone feature extractor and a pose estimation head module.

Figure 5:
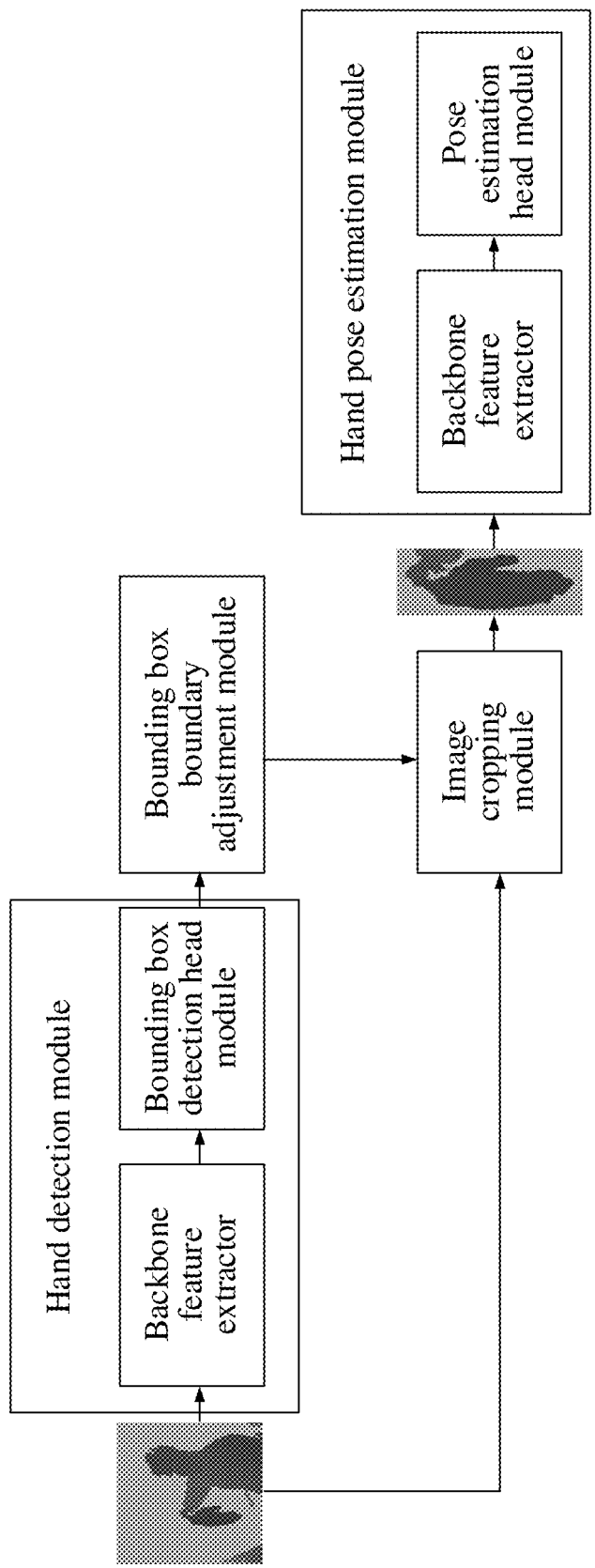
FIG. 5 is a schematic flowchart of a hand pose estimation in the related art.

As an example, FIG. 5 is a schematic flowchart of a hand pose estimation in the related art. As illustrated in FIG. 5, after an initial depth image including a hand is obtained, the hand detection may be performed, that is, the backbone feature extractor and the bounding box detection head module included in the hand detection process are used to perform the detection processing. In this case, a boundary of the bounding box can be adjusted, the adjusted bounding box can be used for cropping the image. The hand pose estimation can be performed on the cropped image, that is, the backbone feature extractor and the pose estimation head module included in the hand pose estimation process can be used to perform the pose estimation processing.

It should be noted that in a process of hand pose detection in the related art, tasks of the hand detection process and the hand pose estimation process are completely separated from each other. To connect the two tasks, a position of the output bounding box can be adjusted to a mass center of pixels inside the bounding box, and a size of the bounding box is slightly enlarged to include all the hand pixels. Further, the adjusted bounding box is used to crop the initial depth image, and the cropped image is inputted into the task of hand pose estimation. It should be noted that, in the process of hand pose adjustment as illustrated in FIG. 5, the backbone feature extractor is applied twice to extract image features, which leads to duplicated computation, thereby increasing an amount of computation.

In order to solve the above-mentioned problem of large amount of computation, ROIAlign can be introduced. Specifically, ROIAlign is a regional feature aggregation method, which can well solve the problem of regional misalignment caused by two-time quantization in operations of ROIPool. In the detection task, the accuracy of detection result can be improved by replacing ROIPool with ROIAlign. That is, ROIAlign layer removes harsh quantization of ROIPool and correctly aligns the extracted features with the input.

It can be seen that, ROIAlign can avoid any quantification of ROI boundaries or bins, e.g., x/16 can be used here instead of [x/16]. In addition, bilinear interpolation can also be used to calculate the exact values of inputted features at four regularly sampled positions in each RoI bin, and the result is aggregated (using the maximum value or the average value). FIG. 6 is a schematic diagram of a bilinear interpolation effect of ROIAlign in the related art. As illustrated in FIG. 6, a dashed grid represents a feature map, bold solid lines represent an ROI (e.g., 2×2 regions), and 4 sampling points are dotted in each bin. The RoIAlign uses the adjacent grid points on the feature map to perform bilinear interpolation calculations, so as to obtain the value of each sampling point. No quantization is performed on any coordinates involved in ROI bins or the sampling points. It should also be noted that, the detection results are not sensitive to the accuracy of sampling locations or the number of the sampling points, as long as no quantization is performed.

In addition, Non-Maximum Suppression (NMS) has been widely used in several key aspects of computer vision and is a part of various detection methods such as edge, corner, or object detection, capable of overcoming a defect that several detection groups appear near a real position, which is resulted from an imperfect ability of a conventional detection algorithm to localize the concept of interest.

Specifically, in the context of target detection, the methods based on window-sliding often produce multiple high-scoring windows, which are close to the correct location of the object. However, due to the generalization ability of a target detector, the smoothness of a response function, and a visual correction of close-by windows, this relatively dense output is often unsatisfactory for understanding the content of an image. That is, in this step, the assumed number of windows is uncorrelated with the real number of objects in the image. Therefore, the goal of NMS is to retain only one window per detection group, corresponding to the precise local maximum of the response function, to optimally obtain only one detection per object. FIG. 7 is a schematic diagram of an effect of NMS in the related art. As illustrated in FIG. 7, after several detection frames are obtained on the left side, the NMS method can be applied, thereby finally obtaining a target detection box illustrated on the right side. That is, NMS aims to retain only one target window.

Further, FIG. 8a and FIG. 8b are schematic diagrams of a union and an intersection in the related art. As illustrated in FIG. 8, two boundary boxes are provided and denoted by BB1 and BB2, respectively. The black area in FIG. 8a is the intersection of BB1 and BB2, which is denoted by BB1∩BB2, i.e., the overlapping area of B1 and BB2; and the black area in FIG. 8b is the union of BB1 and BB2, which is denoted by BB1∪BB2, i.e., the merged area of BB1 and BB2. Specifically, the calculation formula of the intersection-to-union ratio (represented by IoU) is presented by the following equation:

$$IoU = \frac{\text{Area of Overlap}}{\text{Area of Union}} = \frac{BB1 \cap BB2}{BB1 \cup BB2} \tag{1}$$

In addition, in the hand pose estimation, coordinates of each pixel in the image can be represented by using the XYZ coordinate system or the UVD coordinate system. Here, (x, y, z) are pixel coordinates in the XYZ coordinate system, and (u, v, d) are pixel coordinates in the UVD coordinate system. If $C_x$ and $C_y$ represent coordinates of a principal point, which should be located at the center of the image in the optimal case; and if $f_x$ and $f_y$ are focal lengths along a direction x and a direction y, respectively, a conversion relationship between the UVD coordinate system and the XYZ coordinate system is specifically as illustrated in equation (2), $$\begin{cases} x = \dfrac{(u - C_x) \times d}{f_x} \\ y = \dfrac{(v - C_y) \times d}{f_y} \\ z = d \end{cases} \tag{2}$$

Currently, as schemes of the hand pose estimation, either a fully-connected layer to regress key point coordinates of the hand, or a classification-based method is adopted to predict spatial positions of key points. Specifically, the regression-based method calculates hand poses in a global manner, i.e., each key point is predicted using all the information of key point features. In contrast, the classification-based method adopts a local manner, i.e., features of adjacent key points are gradually obtained. Due to the unconstrained global and local pose changes, frequent occlusions, local self-similarity, a high degree of articulation, and other characteristics, it is a challenging task to perform hand pose estimation in a more accurate manner.

In order to solve problems of hand pose estimation in the related art, the embodiments of the present disclosure provide a hand pose estimation method and apparatus, and a computer storage medium. Specifically, after obtaining a hand feature map, the hand pose estimation apparatus can obtain deeper image information and increase an image resolution through feature extraction and an image up-sampling processing, and the hand pose estimation apparatus can input the obtained target resolution feature map to the predetermined depth classification network to obtain the depth maps corresponding to the hand key points. Thus, the hand key points are classified based on depth intervals, and thus the depth values corresponding to the hand key points can be determined based on the depth maps, thereby further implementing the hand pose estimation based on the depth values. Thus, the hand pose estimation apparatus of the present disclosure can accurately and efficiently perform the hand pose depth estimation, thereby achieving the high-precision hand pose estimation.

The technical solutions according to the embodiments of the present disclosure will be clearly and completely described below with reference to the accompanying drawings of the embodiments of the present disclosure.

It should be noted that, in the embodiments of the present disclosure, the main technical problem to be solved is the 3D hand pose estimation, and more particularly, is hand depth estimation in the 3D hand pose estimation.

Figure 9:
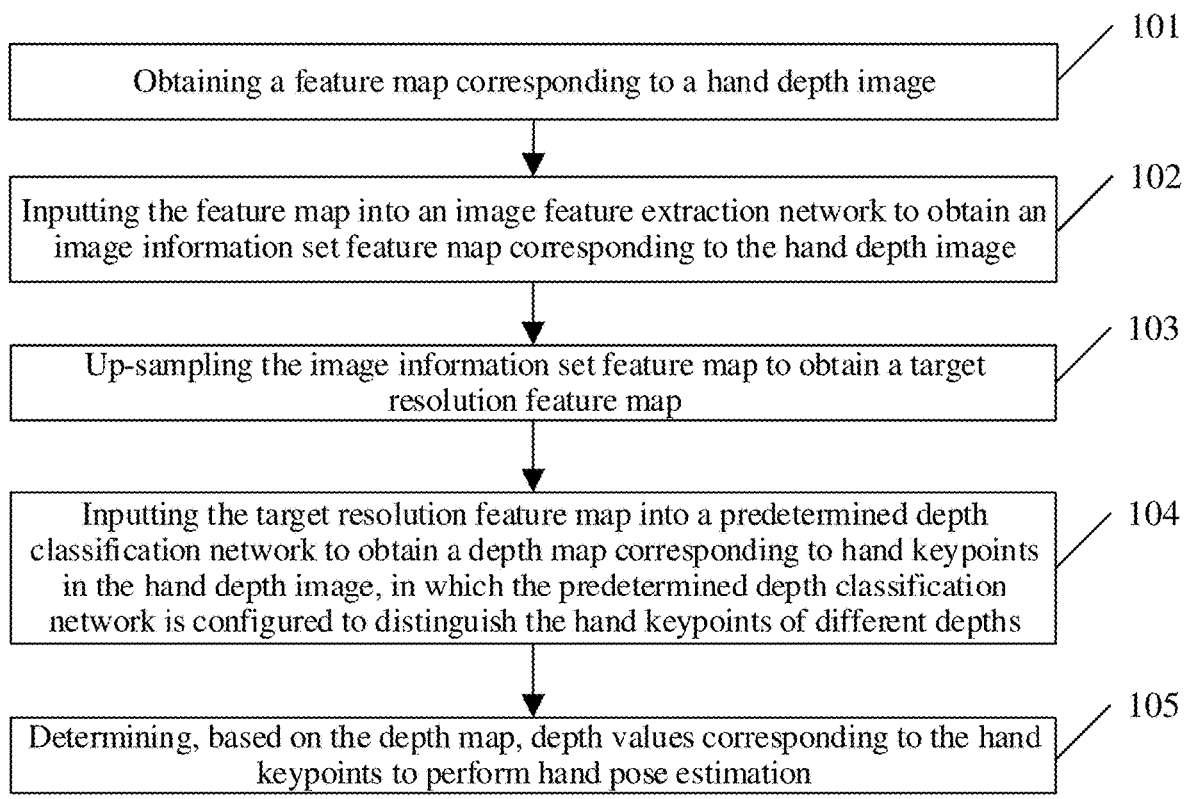
FIG. 9 is a first flowchart of an implementation of a hand pose estimation method according to an embodiment of the present disclosure.

An embodiment of the present disclosure provides a hand pose estimation method. FIG. 9 is a first schematic flowchart of an implementation of a hand pose estimation method according to an embodiment of the present disclosure. As illustrated in FIG. 9, in the embodiment of the present disclosure, the hand pose estimation method implemented by a hand pose estimation apparatus may include the following actions in blocks.

At block 101, a feature map corresponding to a hand depth image is obtained.

In the embodiments of the present disclosure, the hand pose estimation apparatus may obtain the feature map of the hand depth image.

It should be noted that, in the embodiments of the present disclosure, the hand pose estimation can be applied to the hand pose estimation apparatus, or an electronic device integrated with the hand pose estimation apparatus. The electronic device may be a smart phone, a tablet computer, a notebook computer, a palmtop computer, a Personal Digital Assistant (PDA), a navigation device, a wearable device, a desktop computer, etc., and the embodiments of the present disclosure are not limited to any of these examples.

It can be understood that, a human hand may have a plurality of skeleton nodes, i.e., key points. Usually, the hand includes at least 20 key points. In the embodiments of the present disclosure, specific positions of the 20 key points of the hand are as illustrated in FIG. 3.

Optionally, in the embodiments of the present disclosure, the feature map of the hand depth image is a ROIAlign feature map. That is, the hand pose estimation apparatus further performs the hand pose estimation based on a ROIAlign feature map of the hand.

Specifically, the hand pose estimation apparatus can obtain an initial depth image including a target hand (for example, FIG. 1), and then perform a hand detection processing on the initial depth image of the target, i.e., the hand, by using a bounding box detection method, i.e., determining a position and size corresponding to the hand, thereby obtaining a depth image having only the hand (for example, FIG. 2). Further, the hand pose estimation apparatus uses a ROIAlign feature extractor, which is constructed based on a ROIAlign feature extraction method corresponding to FIG. 6, to perform shallow feature extraction on the hand depth image, including a general outline and edge positions of the hand, so as to obtain the ROIAlign feature map corresponding to the target object, i.e., the hand.

Figure 10:
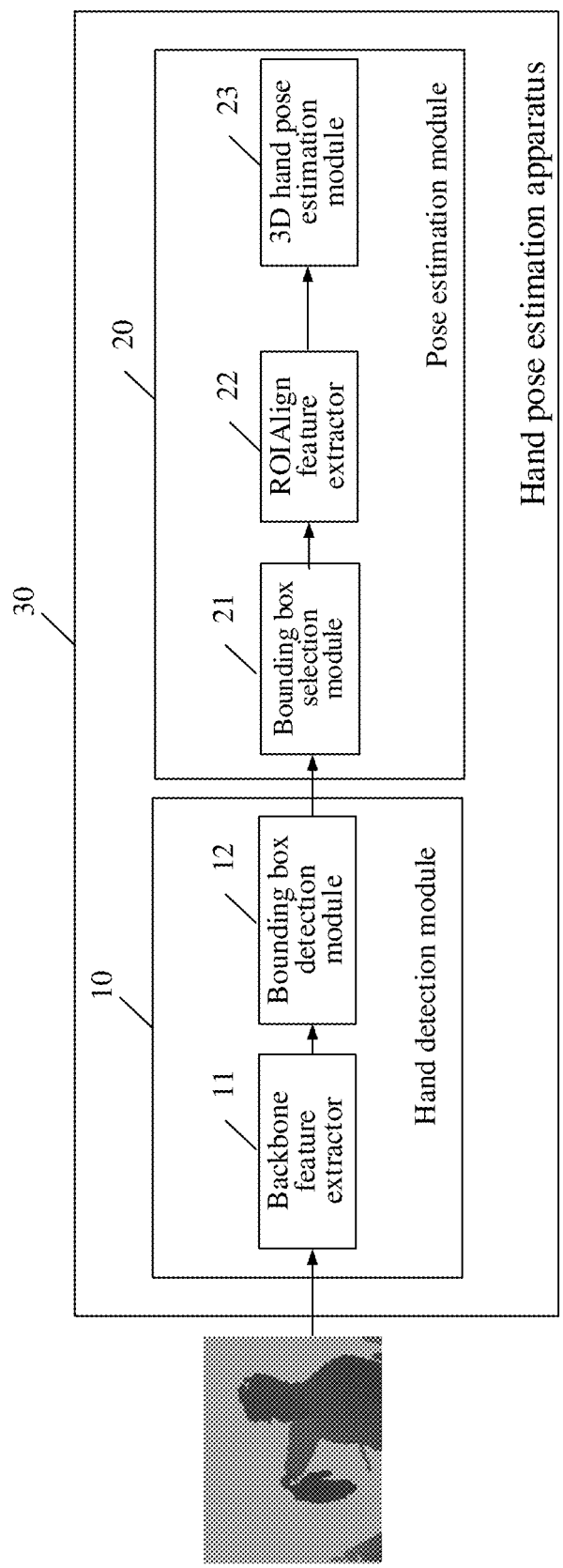
FIG. 10 is a schematic diagram of an application architecture of a hand pose estimation method according to an embodiment of the present disclosure.

As an example, FIG. 10 is a schematic diagram of an application architecture of a hand pose estimation method according to an embodiment of the present disclosure. As illustrated in FIG. 10, a hand pose estimation apparatus 30 mainly includes a hand detection module (10) and a pose estimation module (20). The hand detection module includes a backbone feature extractor (11) and a bounding box detection module (12). The pose estimation module includes a bounding box selection module (21), a ROIAlign feature extractor (22), and a 3D hand pose estimation module (23).

Specifically, the hand pose estimation apparatus can perform feature extraction through the backbone feature extractor (11) and perform target (hand) detection through the bounding box detection head module (12), so as to perform a hand detection processing on the initial depth image of the target object including the hand, thereby obtaining a plurality of boundary boxes. Then, the hand pose estimation apparatus can select, from the plurality of boundary boxes, a boundary box having the highest confidence through the bounding box selection module (21). That is, after the target hand depth image having the highest confidence is obtained, the hand pose estimation apparatus can input the hand depth image having the highest confidence into the ROIAlign feature extractor (22) for feature extraction, thereby obtaining the ROIAlign feature map of the hand. Further, the hand pose estimation apparatus can input the ROIAlign feature map of the hand into the 3D hand pose estimation module (23) to perform the hand pose estimation.

Further, in the embodiments of the present disclosure, after obtaining the ROIAlign feature map corresponding to the hand depth image, the hand pose estimation apparatus may further extract deeper image information based on the ROIAlign feature map.

At block 102, the feature map is inputted into an image feature extraction network to obtain an image information set feature map corresponding to the hand depth image.

In the embodiments of the present disclosure, after obtaining the ROIAlign feature map of the hand, the hand pose estimation apparatus may input the feature map into the image feature extraction network to obtain the image information set feature map corresponding to the hand depth image.

It should be noted that, in the embodiments of the present disclosure, the ROIAlign feature map is the extraction of shallow image information such as hand edges and outlines, and the image feature network can extract deep image information such as hand curvature and length.

It can be understood that, after the shallow feature extraction of ROIAlign and the deep feature extraction of the image feature network are performed, all the image information of the hand can be obtained, i.e., the image information set feature map corresponding to the hand depth image according to the embodiments of the present disclosure.

It should be noted that, in the embodiments of the present disclosure, the image feature extraction network includes a first dimensionality reduction network for performing channel reduction on image information, and a deep convolutional network for performing deep feature extraction based on the dimensionality-reduced image information.

Specifically, in order to reduce a computation amount of the processing, the hand pose estimation apparatus can first input the ROIAlign feature map into the first dimensionality reduction network to perform, through the first dimensionality reduction network, a channel reduction processing on the ROIAlign feature map, thereby obtaining a first dimensionality-reduced feature map.

Further, the hand pose estimation apparatus can further input the obtained first dimensionality-reduced feature map into the deep convolutional network to perform, through the deep convolutional network, deeper image information extraction on the first dimensionality-reduced network, thereby obtaining the image information set feature map.

Optionally, in the embodiments of the present disclosure, the deep convolutional network may use an iterative convolutional network in which an input and an output are superimposed onto each other, i.e., the input of each layer of convolutional network is an input of a previous layer of convolutional network plus an output of the previous layer of convolutional network. The same convolutional network can be used for multiple times of iterative convolution processing, such that the final number of feature maps outputted by the deep convolutional network is the same as the number of feature maps of the original input. That is, the deep convolutional network is only an extraction process of image information, without changing the number of feature maps of the image.

As an example, after obtaining 8×8×256 ROIAlign feature maps, the hand pose estimation apparatus may input the 8×8×256 feature maps into a 3×3×128 first dimensionality reduction network for channel reduction, so as to obtain 8×8×128 dimensionality-reduced feature maps. The hand pose estimation apparatus can further input the 8×8×128 dimensionality-reduced feature maps into a deep convolutional network with four convolution layers, whose inputs and outputs are superimposed, to extract the image information, thereby obtaining 8×8×128 image information set feature maps in the same number as the dimensionality-reduced feature maps.

Further, in the embodiments of the present disclosure, after obtaining the image information set feature map, the hand pose estimation apparatus may further perform an up-sampling process on the image information set feature map.

At block 103, up-sampling processing is performed on the image information set feature map to obtain a target resolution feature map.

In the embodiments of the present disclosure, after obtaining the image information set feature map, the hand pose estimation apparatus may further perform the up-sampling processing on the image information set feature map, in order to obtain the target resolution feature map.

It can be understood that processes of performing the ROIAlign shallow feature extraction, the first dimensionality reduction processing, and the deep feature extraction processing corresponding to the deep convolutional network are processes for reducing a resolution of an original image. In this regard, in order to avoid an image information loss, which may occur in the subsequent depth estimation on the low-resolution feature map, in the embodiments of the present disclosure, the hand pose estimation apparatus may increase the resolution of the image information set feature map by up-sampling, i.e., a deconvolution processing.

Optionally, the resolution of the image information set feature map can be increased to the same as that of the initial depth feature map, or the same as that of the hand depth image after the bounding box detection, thereby obtaining a corresponding target resolution feature map.

As an example, assuming that the initial depth image or the hand depth image feature map is 16×16×128, the hand pose estimation apparatus needs to perform a 2-time up-sampling processing on the 8×8×128 image information feature maps to obtain the 16×16×128 target resolution feature maps.

Further, in the embodiments of the present disclosure, after obtaining the target resolution feature map through the up-sampling processing, the hand pose estimation apparatus may further classification processing on a depth interval of the hand key points in the hand depth image based on the target resolution feature map.

At block 104, the target resolution feature map is inputted into a predetermined depth classification network to obtain depth maps corresponding to hand key points in the hand depth image. The predetermined depth classification network is configured to distinguish the hand key points of different depths.

In the embodiments of the present disclosure, after obtaining the target resolution feature map, the hand pose estimation apparatus may input the target resolution feature map into the predetermined depth classification network, to further obtain the depth map corresponding to each hand key point in the hand depth image.

It can be understood that, when the human hand performs a certain pose or action, the corresponding positions, curvatures and gestures of respective fingers are different. In this regard, when the hand is in a specific position, an interval distance, i.e., a depth interval value, between the same finger of the hand and a position such as the head, chest, or eye of the human body may be different, and the interval values corresponding to different fingers of the hand are more different. In the embodiments of the present disclosure, the hand gesture detection apparatus may set the positions of the hand key points, and classify each hand key point based on different depth intervals.

Specifically, in the embodiments of the present disclosure, the hand pose estimation apparatus may establish a predetermined depth classification network, and then classify the hand key points based on different depth intervals through the depth classification network. That is, the hand gesture detection apparatus distinguishes the hand key points with different depths through the predetermined depth classification network.

It should be noted that, in the embodiments of the present disclosure, the depth map refers to a picture or a channel including distance information of the hand key point, and the distance information is a depth interval value.

Specifically, in the embodiments of the present disclosure, the predetermined depth classification network can set the number of hand key points and different reference depth interval values. The process of inputting the target resolution feature map obtained after deep feature extraction and the up-sampling processing into the predetermined depth classification network is a process of coarsely predicting depth interval values of respective key points. Then, the hand key points are classified based on the predicted depth interval values to generate the depth maps including the predicted depth interval values corresponding to the hand key points. That is, by means of the predetermined depth classification network, the depth interval values corresponding to N hand key points can be coarsely predicted, and the different depth interval values correspond to different depth maps.

Optionally, in the embodiments of the present disclosure, the hand pose estimation apparatus may predefine 20 key points, and after inputting the target resolution feature map into the predetermined depth classification network, the hand gesture detection apparatus can obtain 20 depth maps, which correspond to the 20 key points and include the predicted depth interval values corresponding to the 20 key points.

Further, in the embodiments of the present disclosure, after obtaining the depth maps corresponding to the hand key points, the hand pose estimation apparatus may further determine a real depth value corresponding to the key point based on the depth map.

At block 105, depth values corresponding to the hand key points are determined based on the depth maps, to realize the hand gesture estimation.

In the embodiments of the present disclosure, after obtaining the depth maps corresponding to the hand key points, the hand pose estimation apparatus may determine the depth values corresponding to the hand key points based on the depth maps, so as to achieve the hand pose estimation based on the depth values.

It can be understood that, since the depth maps include the depth interval values corresponding to respective hand key points, the hand pose estimation apparatus can further determine depth coordinates of the hand key points based on the depth interval values in the depth maps of respective hand key points.

It can be seen that, in the embodiments of the present disclosure, the depth interval values corresponding to respective hand key points are coarsely predicted by means of depth classification and are classified, such that the depth values corresponding to respective hand key points can be further determined based on the depth interval values in a more precise manner, thereby achieving an accurate and efficient hand pose depth estimation.

In the hand pose estimation method provided by the embodiments of the present disclosure, a hand pose estimation apparatus can: obtain a feature map corresponding to a hand depth image; input the feature map into an image feature extraction network to obtain an image information set feature map corresponding to the hand depth image; up-sample the image information set feature map to obtain a target resolution feature map; input the target resolution feature map into a predetermined depth classification network to obtain depth maps corresponding to hand key points in the hand depth image, in which the predetermined depth classification network is configured to distinguish the hand key points of different depths; and determine, based on the depth maps, depth values corresponding to the hand key points to perform hand pose estimation. Thus, in the present disclosure, after the hand feature map is obtained, the hand pose estimation apparatus can obtain deeper image information and increase an image resolution through the feature extraction and the image up-sampling processing, and the hand pose estimation apparatus can input the obtained target resolution feature map into the predetermined depth classification network to obtain the depth maps corresponding to the hand key points. That is, the hand key points are classified based on the depth intervals, and thus the depth values corresponding to the hand key points can be determined based on the depth maps, thereby achieving the hand pose estimation based on the depth values. It can be seen that, the hand pose estimation apparatus of the present disclosure can perform an accurate and efficient hand pose depth estimation, thereby achieving the high-precision hand pose estimation.

Figure 11:
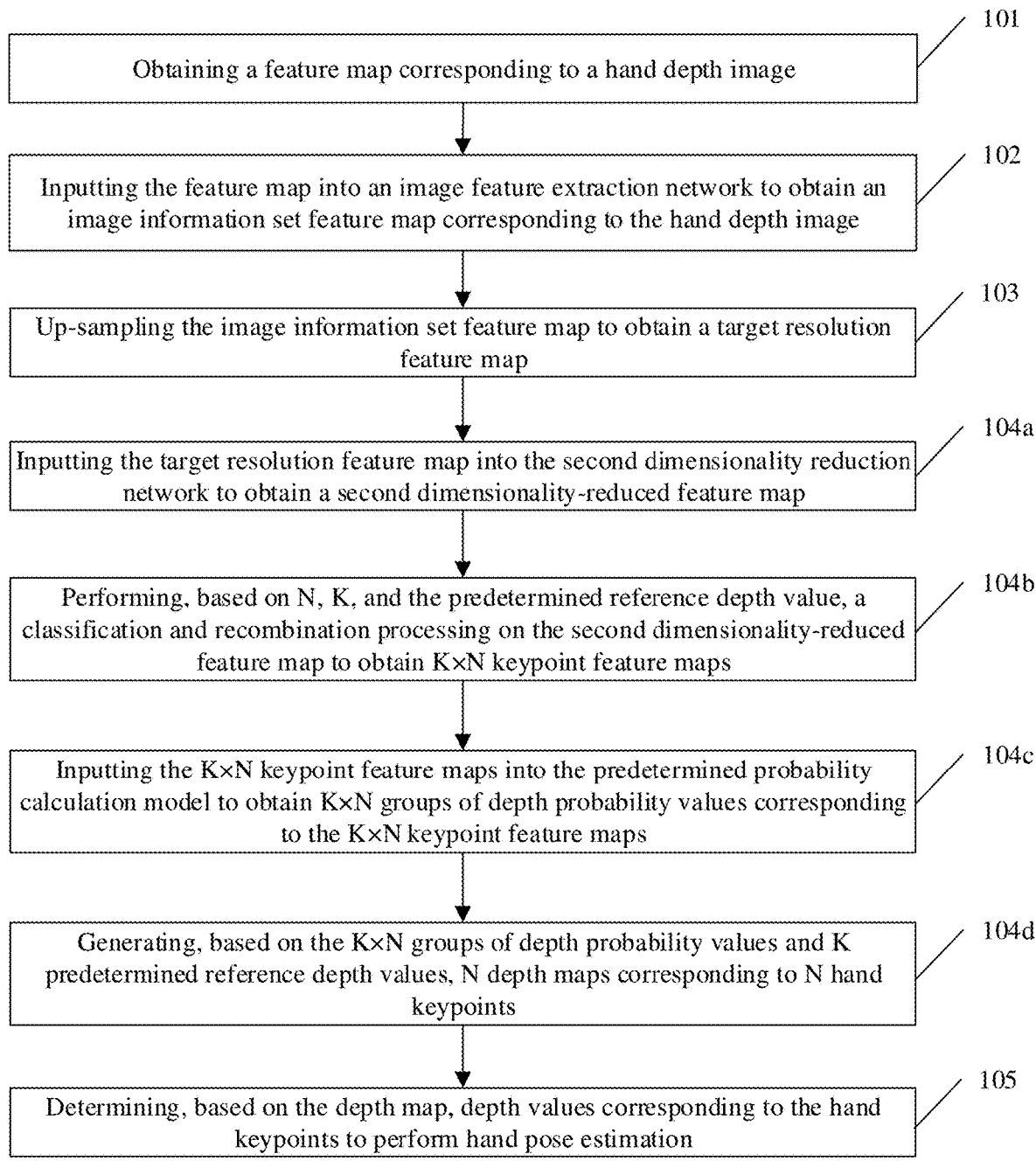
FIG. 11 is a second flowchart of an implementation of a hand pose estimation method according to an embodiment of the present disclosure.

Based on the above embodiments, in another embodiment of the present disclosure, FIG. 11 is a second schematic flowchart of an implementation of a hand pose estimation method according to an embodiment of the present disclosure. As illustrated in FIG. 11, in the present embodiment of the present disclosure, a method, in which the hand pose estimation apparatus inputs the target resolution feature map into the predetermined depth classification network to obtain the depth maps corresponding to the hand key points in the hand depth image, may include the following actions in blocks.

At block 104a, a target resolution feature map is inputted into a second dimensionality reduction network to obtain a second dimensionality-reduced feature map.

In the embodiments of the present disclosure, after obtaining the target resolution feature map, the hand pose estimation apparatus shall input the target resolution feature map into the second dimensionality reduction network to obtain the second dimensionality-reduced feature map.

It should be noted that, in the embodiments of the present disclosure, the predetermined depth classification network includes the second dimensionality reduction network and a predetermined probability computation model. Here, the second dimensionality reduction network is established based on a predefined number of the hand key points and a category corresponding to predetermined reference depth values.

It should be noted that in the embodiments of the present disclosure, on basis of a large number of experimental results, it is proved that hand pose estimation can be performed based on N hand key points, and the depth interval values of the hand are coarsely divided into K categories. Therefore, to facilitate subsequent data computation, the hand pose estimation apparatus inputs the target resolution feature map into the second dimensionality reduction network, which is established based on a predetermined number N of the hand key points and a category K corresponding to the predetermined reference depth value, so as to perform a channel reduction operation on the target resolution feature map, thereby obtaining the second dimensionality-reduced feature map having a number of channels reduced to N×K.

Further, after obtaining the second dimensionality-reduced feature map, the hand pose estimation apparatus may further perform a classification and recombination processing on the second dimensionality-reduced feature map.

At block 104b, based on N, K, and the predetermined reference depth value, a classification and recombination processing is performed on the second dimensionality-reduced feature map to obtain K×N key point feature maps.

In the embodiments of the present disclosure, after obtaining the second dimensionality-reduced feature map by performing a dimensionality reduction processing on the target resolution feature map, the hand pose estimation apparatus can continue to perform, based on the predetermined number N of the hand key points, predetermined reference depth interval values, and a category K corresponding to the predetermined reference depth interval value, the classification and recombination processing on the second dimensionality-reduced feature map to obtain the K×N key point feature maps.

It should be noted that, in the embodiments of the present disclosure, based on the category of the predetermined reference depth interval value, the classification and recombination processing is to classify and recombine the second dimensionality-reduced feature maps with K×N channels, i.e., the K×N second dimensionality-reduced feature maps, into K groups of key point feature maps. Each group of key point feature maps corresponds to a reference depth interval value, and feature maps corresponding to every N different hand key points are recombined into one group.

Further, in the embodiments of the present disclosure, after obtaining the K×N key point feature maps through the classification and recombination processing performed on the second dimensionality-reduced feature map, the hand pose estimation apparatus can further calculate probability values that respective hand key points correspond to different reference depth interval values.

At block 104c, the K×N key point feature maps are inputted into a predetermined probability computation model to obtain K×N groups of depth probability values corresponding to the K×N key point feature maps.

In the embodiments of the present disclosure, after the K×N key point feature maps are obtained by performing the classification and recombination processing on the feature maps based on the predetermined number N of the hand key points, the predetermined reference depth interval values, and the category K corresponding to the predetermined reference depth interval value, the hand pose depth estimation apparatus can input the K×N key point feature maps into the predetermined probability computation model to obtain K×N groups of depth probability values corresponding to the K×N key point feature maps.

It should be noted that, in the embodiments of the present disclosure, the predetermined probability computation model is configured to calculate probability values that respective key point feature maps correspond to the different reference depth interval values. Here, the key point feature maps correspond to probabilities of the depth interval values are in one-to-one correspondence.

Optionally, the predetermined probability computation model is a softmax function, also referred to as a normalized exponential function, which is actually a logarithmic normalization of the gradient of a finite-term discrete probability distribution, and is a generalization of logistic functions. The softmax function can "compress" a K-dimensionality vector z containing an arbitrary real number into another K-dimensionality real vector δ(z), allowing each element to fall into a range of (0, 1), and a sum of all elements to be 1.

Further, for the key point feature maps, the softmax function can be used to obtain the probability values that the respective key point feature maps correspond to the different reference depth interval values. Specifically, K×N groups of depth probability values are obtained for K×N key point feature maps. The number of depth probability values in each group is determined based on the resolution of the feature map.

It should be noted that, in the embodiments of the present disclosure, the hand pose estimation apparatus pre-establishes a predetermined classification map. A predetermined number of grids in the predetermined classification map is related to a size parameter of the key point feature map. For example, when the key point feature map has a size parameter of 16×16, the number of grids corresponding to the classification map is 16×16.

Further, for each group in the above K×N groups of depth probability values, the number of depth probability values corresponds to the number of grids. For example, when the number of grids is 16×16, there are 16×16 depth probability values in one group of depth probability values corresponding to one depth interval category corresponding to one key point.

Further, in the embodiments of the present disclosure, after determining the K×N groups of depth probability values corresponding to the K×N key point feature maps, the hand pose estimation apparatus may further determine a coarse depth interval value corresponding to each key point and generate a depth map corresponding to the coarse depth interval value.

At block 104d, N depth maps corresponding to N hand key points are generated based on the K×N groups of depth probability values and K predetermined reference depth values.

In the embodiments of the present disclosure, after determining the K×N groups of depth probability values, the hand pose estimation apparatus may further generate, based on the K×N groups of depth probability values and the K predetermined reference depth values, the N depth maps corresponding to the N hand key points.

It can be understood that, in the embodiments of the present disclosure, since probabilities that the respective key points correspond to the different reference depth interval values are obtained through the predetermined probability computation model, the hand depth estimation apparatus can multiply, for each hand key point, the predetermined reference depth interval value by the probability corresponding to the hand key point to determine coarse depth interval values of the key point in different directions.

Specifically, the hand pose estimation apparatus may perform, for each hand key point of the N hand key points, a weighted summation operation on K groups of depth probability values corresponding to the hand key point and K predetermined reference depth values. That is, the hand pose estimation apparatus may perform, for each predetermined grid, a weighted summation operation on the depth probability values corresponding to the predetermined grid and the predetermined reference depth interval values, so as to obtain the N groups of weighted sum values, i.e., the coarse depth interval values, corresponding to the N hand key points and generate N depth maps including the N groups of depth interval values.

In the hand pose estimation method provided by the embodiments of the present disclosure, the hand pose estimation apparatus inputs the obtained target resolution feature map into the predetermined depth classification network to obtain the depth maps corresponding to the hand key points. That is, by classifying the hand key points based on the depth intervals, the hand pose depth estimation can be performed accurately and efficiently, thereby achieving the high-precision hand pose estimation.

Figure 12:
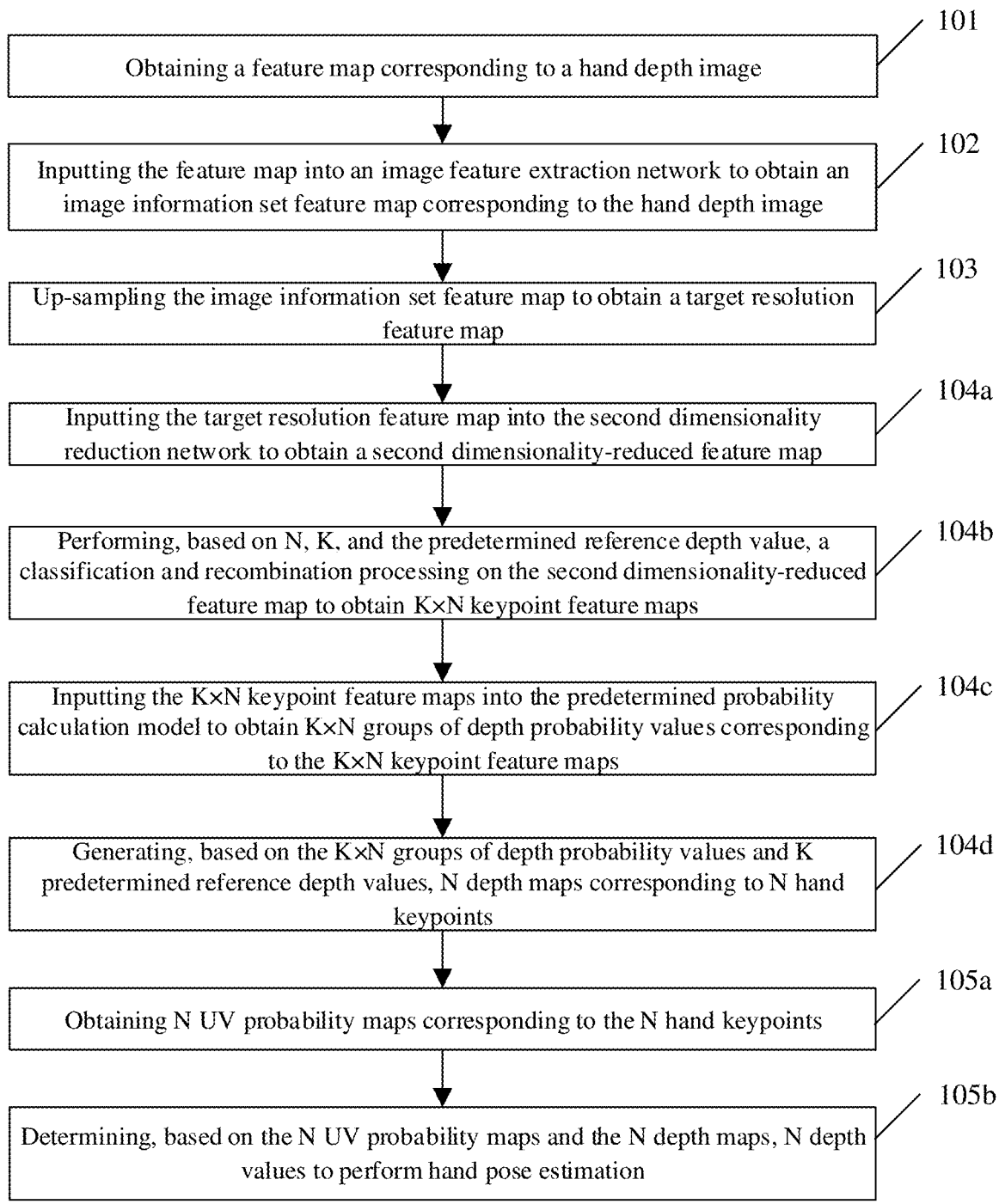
FIG. 12 is a third flowchart of an implementation of a hand pose estimation method according to an embodiment of the present disclosure.

On basis of the above embodiments, in another embodiment of the present disclosure, FIG. 12 is a third schematic flowchart of an implementation of a hand pose estimation method according to an embodiment of the present disclosure. As illustrated in FIG. 12, in the present embodiment of the present disclosure, the hand pose estimation apparatus determines, based on the depth maps, the depth values corresponding to the hand key points, and the hand pose estimation method may include the following actions in blocks.

At block 105a, N UV probability maps corresponding to N hand key points are obtained.

At block 105b, N depth values are determined based on the N UV probability maps and the N depth maps, so as to perform hand pose estimation.

In the embodiments of the present disclosure, after obtaining the depth maps corresponding to the hand key points in the hand depth image, the hand pose estimation apparatus can further obtain the UV probability maps corresponding to the hand key points, and further determine depth values corresponding to the hand key points based on the UV probability maps and the depth maps.

It should be noted that, in the embodiments of the present disclosure, in order to more accurately determine a precise depth value of each key point on the depth interval, the hand pose estimation apparatus shall obtain the UV probability map corresponding to the key point, i.e., a probability value that a pixel belongs to the key point in the hand depth image. The depth value corresponding to each key point can be further determined based on the pixel probability value corresponding to the key point and the coarse depth interval value included in the depth map.

It should be noted that, in the embodiments of the present disclosure, the resolutions and channels of the UV probability maps and the depth maps are in one-to-one correspondence. That is, the pixel probability value at each predetermined grid in each UV probability map has a corresponding coarse depth interval value at each predetermined grid in each depth map.

Specifically, for the N UV probability maps, the hand pose estimation apparatus can obtain N groups of UV probability values corresponding to N predetermined grids, and then perform, in a predetermined point-to-point manner of the grids, an elementwise-multiply processing on the pixel probability values at all predetermined grids corresponding to each key point and each coarse depth interval value, which is determined by the predetermined depth classification network, i.e., the weighted sum value, to obtain a group of discrete depth values corresponding to each key point, i.e., N groups of discrete depth probability values.

Further, the hand pose estimation apparatus performs a summation operation on each group of the N groups of discrete depth values to obtain the N depth values, which correspond to the N hand key points in one-to-one correspondence.

Further, in the embodiments of the present disclosure, after obtaining the depth values corresponding to the hand key points, the hand pose estimation apparatus can further perform the 3D hand pose estimation based on the depth values.

In the hand pose estimation method provided by the embodiments of the present disclosure, after the hand pose estimation apparatus inputs the obtained target resolution feature map into the predetermined depth classification network to obtain the depth maps that includes the coarse depth interval value corresponding to the hand key point, the hand pose estimation apparatus can accurately calculate the depth value corresponding to the hand key point based on the depth maps and the UV probability map that corresponds to the hand key point. In this way, the accurate and efficient hand pose depth estimation can be implemented to further achieve the high-precision hand pose estimation.

Figure 13:
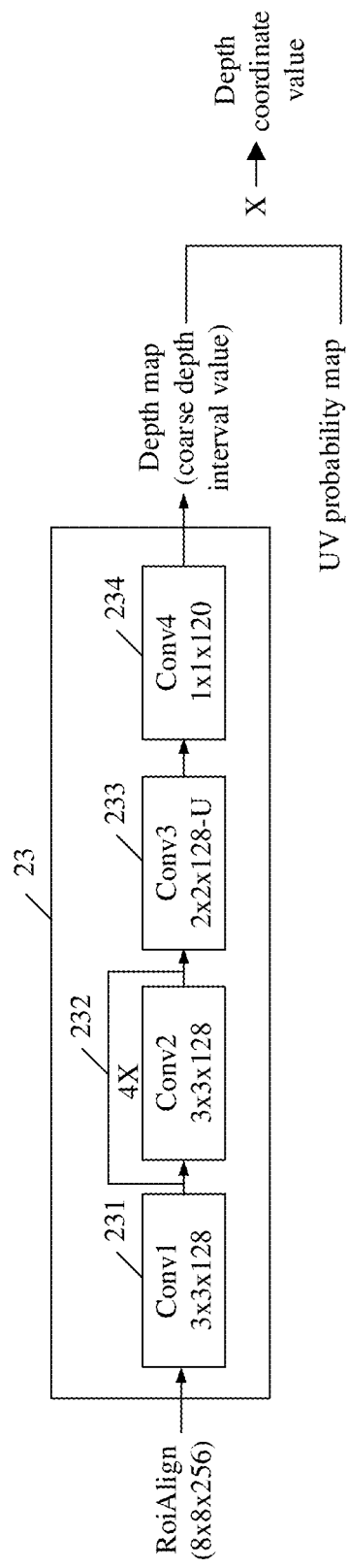
FIG. 13 is a schematic diagram of a processing process of hand pose depth estimation according to an embodiment of the present disclosure.

On basis of the above embodiments, for example, on basis of the 3D hand pose estimation module (23) illustrated in FIG. 10, in an embodiment of the present disclosure, FIG. 13 is a schematic diagram of a processing process of hand pose depth estimation according to an embodiment of the present disclosure. As illustrated in FIG. 13, the 3D hand pose estimation module includes a first dimensionality reduction network 3×3×128 (231), a deep convolutional network 3×3×128 (232), an up-sampling network 2×2×128 (233), and a second dimensionality reduction network 1×1×120 (234).

Specifically, after obtaining the ROIAlign feature map 8×8×256 of the hand, the hand pose estimation apparatus can input the ROIAlign feature map 8×8×256 into the first dimensionality reduction network 3×3×128 (231) to obtain the first dimensionality-reduced network 8×8×128. Then, to extract deeper image information such as finger curvature, finger length, etc., the first dimensionality-reduced network 8×8×128 is inputted into a 3×3×128 deep convolutional network (232), and four convolutions are performed by superimposing and iterating input information and output information, thereby further obtaining the image information set feature map 3×3×128. After the deep abstract features of the hand are extracted, in order to avoid a feature information loss and facilitate the subsequent classification of the feature information, the hand pose estimation apparatus uses a 2×2×128 up-sampling network (233) to up-sample the image information set feature map 3×3×128 for obtaining the target resolution feature map 16×16×128.

In order to facilitate experimental computation, the designer set a number of hand key points to 20 in advance, and pre-defined 6 depth intervals as [20, 30, 40, 50, 60, 70], in centimeters. For the sake of classification of the depth intervals of the key points, the hand pose estimation apparatus can input the target resolution feature map 16×16×128 into the second dimensionality reduction network 1×1×120 (234) to obtain the second dimensionality-reduced feature map 16×16×120. It can be seen that by reducing the number of channels to 120 (i.e., 120 on spatial), a subsequent data processing can also be facilitated in accordance with a design requirement of 20 key points×6 kinds of reference depth interval values.

Further, after obtaining the second dimensionality-reduced feature map 16×16×120, based on the predetermined number 20 of hand key points and the predetermined 6 kinds of reference depth interval values, the hand pose estimation apparatus can recombine the second dimensionality-reduced feature map into a key point feature map 16×16×20×6, then input the key point feature map into the predetermined probability computation model (the softmax function), to calculate the probability value corresponding to each key point feature map, i.e., the probability map 16×16×20×6. The hand pose estimation apparatus can use the probability map 16×16×20×6 and the corresponding predetermined depth interval value to perform, based on different key points, the weighted sum operation to obtain the weighted sum value corresponding to each key point, i.e., the coarse depth interval value, and generate the depth map 16×16×20 including the coarse depth interval value. That is, the key points are classified based on the depth intervals. Further, the hand pose estimation apparatus obtains the UV probability map 16×16×20 corresponding to the key point, and performs an elementwise-multiply processing on the depth map and the UV probability map 16×16×20 to obtain 20 groups of discrete depth values corresponding to the 20 key points. Based on the 20 key points, the summation operation is performed on each group of the 20 groups of discrete depth values to obtain precise depth coordinate values corresponding to the 20 key points.

In the hand pose estimation method provided by the embodiments of the present disclosure, after obtaining the ROIAlign feature map of the hand, the hand pose estimation apparatus can obtain deeper image information and increase an image resolution through feature extraction and an image up-sampling processing, and the hand pose estimation apparatus can input the obtained target resolution feature map into the predetermined depth classification network to obtain the depth maps corresponding to the hand key points. That is, the hand key points are classified based on depth intervals, and based on the depth maps, the depth values corresponding to the hand key points can be determined, thereby implementing the hand pose estimation based on the depth values. It can be seen that, the hand pose estimation apparatus of the present disclosure can accurately and efficiently perform the hand pose depth estimation, thereby achieving the high-precision hand pose estimation.

Figure 14:
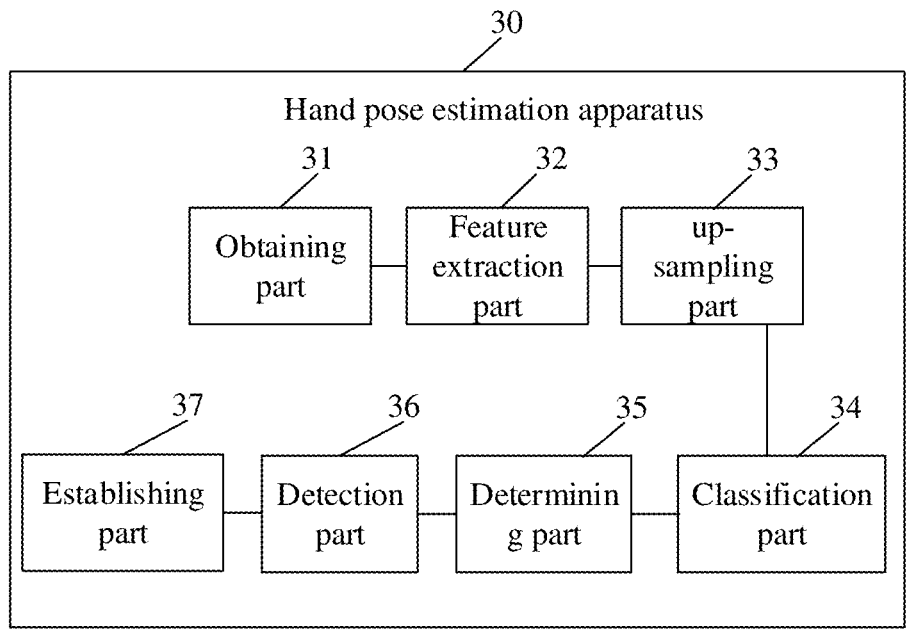
FIG. 14 is a first schematic diagram of a composition structure of a hand pose estimation apparatus according to an embodiment of the present disclosure.

On basis of the above embodiments, in another embodiment of the present disclosure, FIG. 14 is a first schematic diagram of a composition structure of a hand pose estimation apparatus according to an embodiment of the present disclosure. As illustrated in FIG. 14, the hand pose estimation apparatus 30 provided by the present embodiment of the present disclosure may include an obtaining part 31, a feature extraction part 32, an up-sampling part 33, a classification part 34, a determining part 35, a detection part 36, and an establishing part 37.

The obtaining part 31 is configured to obtain a feature map corresponding to a hand depth image.

The feature extraction part 32 is configured to input the feature map into an image feature extraction network to obtain an image information set feature map corresponding to the hand depth image.

The up-sampling part 33 is configured to up-sample the image information set feature map to obtain a target resolution feature map.

The classification part 34 is configured to input the target resolution feature map into a predetermined depth classification network to obtain depth maps corresponding to hand key points in the hand depth image, in which the predetermined depth classification network is configured to distinguish the hand key points of different depths.

The determining part 35 is configured to determine depth values corresponding to the hand key points based on the depth maps to perform hand pose estimation.

Further, in the embodiments of the present disclosure, the image feature extraction network includes a first dimensionality reduction network and a deep convolutional network.

Further, in the embodiments of the present disclosure, the feature extraction part 32 is specifically configured to: input the feature map into the first dimensionality reduction network to obtain a first dimensionality-reduced feature map; and input the first dimensionality-reduced feature map into the deep convolutional network to obtain the image information set feature map.

Further, in the embodiments of the present disclosure, the obtaining part 31 is further configured to, prior to obtaining the feature map corresponding to the hand depth image, obtain an initial depth image including a target hand.

Further, in the embodiments of the present disclosure, the detection part 36 is configured to perform a hand detection processing on the initial depth image to obtain the hand depth image corresponding to the target hand.

Further, in the embodiments of the present disclosure, the feature extraction part 32 is further configured to perform, by means of a feature extractor, a feature extraction on the hand depth image to obtain the feature map.

Further, in the embodiments of the present disclosure, the obtaining part 31 is further configured to, prior to inputting the target resolution feature map into the predetermined depth classification network to obtain the depth maps corresponding to the hand key points in the hand depth image, obtain a predetermined number N of the hand key points, a predetermined reference depth value, and a category K corresponding to the predetermined reference depth value, where N is an integer greater than 1, and K is an integer greater than 1 and smaller than N.

Further, in the embodiments of the present disclosure, the establishing part 37 is configured to establish a second dimensionality reduction network based on N and K.

Further, in the embodiments of the present disclosure, the predetermined depth classification network includes the second dimensionality reduction network and a predetermined probability computation model. The classification part 34 is specifically configured to: input the target resolution feature map into the second dimensionality reduction network to obtain a second dimensionality-reduced feature map; perform, based on N, K, and the predetermined reference depth value, a classification and recombination processing on the second dimensionality-reduced feature map to obtain K×N key point feature maps; input the K×N key point feature maps into the predetermined probability computation model to obtain K×N groups of depth probability values corresponding to the K×N key point feature maps; and generate, based on the K×N groups of depth probability values and K predetermined reference depth values, N depth maps corresponding to N hand key points.

Further, in the embodiments of the present disclosure, the classification part 34 is further specifically configured to: perform, for each hand key point of the N hand key points, a weighted summation operation processing on K groups of depth probability values corresponding to the hand key point and the K predetermined reference depth values, to obtain N groups of weighted sum values corresponding to the N hand key points; and generate the N depth maps based on the N groups of weighted sum values.

Further, in the embodiments of the present disclosure, the determining part 35 is specifically configured to: obtain N UV probability maps corresponding to the N hand key points; and determine, based on the N UV probability maps and the N depth maps, N depth values.

Further, in the embodiments of the present disclosure, the determining part 35 is further specifically configured to: obtain, for the N UV probability maps, N groups of UV probability values corresponding to N predetermined grids; perform, based on the N predetermined grids, an element-wise-multiply processing on the N groups of UV probability values and the N groups of weighted sum values, to obtain N groups of discrete depth values, in which the weighted sum values correspond to the UV probability values in one-to-one correspondence; and perform a summation operation on each group of the N groups of discrete depth values to obtain the N depth values.

Figure 15:
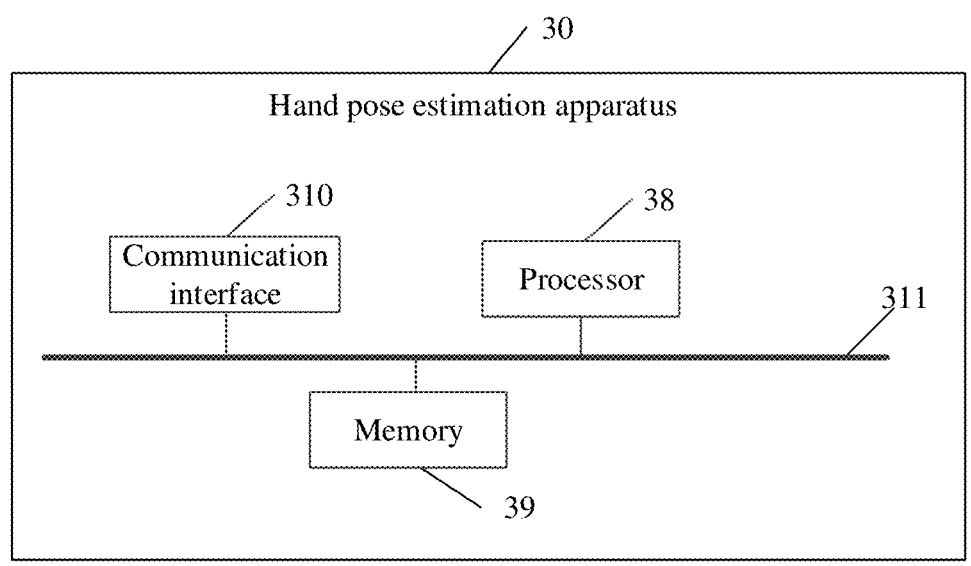
FIG. 15 is a second schematic diagram of a composition structure of a hand pose estimation apparatus according to an embodiment of the present disclosure.

In the embodiments of the present disclosure, further, FIG. 15 is a second schematic diagram of a composition structure of a hand pose estimation apparatus according to an embodiment of the present disclosure. As illustrated in FIG. 15, the hand pose estimation apparatus 30 provided by the present embodiment of the present disclosure may include a processor 38, and a memory having instructions stored thereon and executable by the processor 38. The hand pose estimation apparatus 30 may further include a communication interface 310, and a bus 311 configured to connect the processor 38, a memory 39, and the communication interface 310.

In the embodiments of the present disclosure, the processor 38 may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller, or a microprocessor. It can be understood that, for different devices, an electronic component configured to implement the above functions of the processor may also be of other types, which are not limited in the embodiments of the present disclosure. The hand pose estimation apparatus 30 may also include a memory 39, and the memory 39 may be connected to the processor 38. Here, the memory 39 is configured to store executable program codes, which include instructions executable by a computer. The memory 38 may include a high-speed Random-Access Memory (RAM), and may also include a non-volatile memory, e.g., at least two disk storages.

In the embodiments of the present disclosure, the bus 311 is configured to connect the communication interface 310, the processor 38, the memory 39, and mutual communication among these components.

In the embodiments of the present disclosure, the memory 39 is configured to store instructions and data.

Further, in the embodiments of the present disclosure, the processor 38 is configured to: obtain a feature map corresponding to a hand depth image; input the feature map into an image feature extraction network to obtain an image information set feature map corresponding to the hand depth image; up-sample the image information set feature map to obtain a target resolution feature map; input the target resolution feature map into a predetermined depth classification network to obtain depth maps corresponding to hand key points in the hand depth image, in which the predetermined depth classification network is configured to distinguish the hand key points of different depths; and determine, based on the depth maps, depth values corresponding to the hand key points to perform hand pose estimation.

In practical applications, the memory 39 may be a volatile memory, such as an RAM; or a non-volatile memory, such as a Read-Only Memory (ROM), a flash memory, a Hard Disk Drive (HDD), or a Solid-State Drive (SSD); or a combination of the above types of memory, and provide instructions and data to the processor 38.

In addition, the respective functional modules in respective embodiments of the present disclosure may be integrated in one processing unit, or the respective units may be separate physical existence, or two or more units may be integrated in one unit. The above integrated units can be implemented in a form of hardware, or in a form of a functional software unit.

If the integrated units are embodied in a form of functional software units and are sold or used as separate products, the integrated units may be stored in a computer-readable storage medium. In this regard, all or part of the technical solutions in the embodiments of the present disclosure, or the part thereof that contributes to the prior art, may be embodied in a form of a software product. The computer software product can be stored in a storage medium, and include several instructions that are used for causing a computer device (e.g., a personal computer, a server, or a network device) or a processor to implement all or part of the steps of the method according to the embodiments. The storage medium may include any medium capable of storing program codes, such as a Universal Serial Bus (USB) disk, a mobile hard disk, an ROM, an RAM, a magnetic disk, or an optical disk.

In the hand pose estimation method provided by the embodiments of the present disclosure, a hand pose estimation apparatus can: obtain a feature map corresponding to a hand depth image; input the feature map into an image feature extraction network to obtain an image information set feature map corresponding to the hand depth image; up-sample the image information set feature map to obtain a target resolution feature map; input the target resolution feature map into a predetermined depth classification network to obtain depth maps corresponding to hand key points in the hand depth image, in which the predetermined depth classification network is configured to distinguish the hand key points of different depths; and determine, based on the depth maps, depth values corresponding to the hand key points to perform hand pose estimation. Thus, in the present disclosure, after the hand feature map is obtained, the hand pose estimation apparatus can obtain deeper image information and increase an image resolution through the feature extraction and the image up-sampling processing, and the hand pose estimation apparatus can input the obtained target resolution feature map into the predetermined depth classification network to obtain the depth maps corresponding to the hand key points. That is, the hand key points are classified based on the depth intervals, and thus the depth values corresponding to the hand key points can be determined based on the depth maps, thereby achieving the hand pose estimation based on the depth values. It can be seen that, the hand pose estimation apparatus of the present disclosure can perform an accurate and efficient hand pose depth estimation, thereby achieving the high-precision hand pose estimation.

The embodiments of the present disclosure provide a computer-readable storage medium, having a program stored thereon. The program, when executed by a processor, performs the hand pose estimation method as described above.

Specifically, program instructions corresponding to the hand pose estimation method according to the embodiments may be stored in a storage medium such as an optical disc, a hard disk, and a USB disk. The program instructions corresponding to a computing method and stored in the storage medium, when read or executed by an electronic device, include the following steps of: obtaining a feature map corresponding to a hand depth image; inputting the feature map into an image feature extraction network to obtain an image information set feature map corresponding to the hand depth image; up-sampling the image information set feature map to obtain a target resolution feature map; inputting the target resolution feature map into a predetermined depth classification network to obtain depth maps corresponding to hand key points in the hand depth image, in which the predetermined depth classification network is configured to distinguish the hand key points of different depths; and determining, based on the depth maps, depth values corresponding to the hand key points to perform hand pose estimation.

Those skilled in the art should understand that the embodiments of the present disclosure can be provided as a method, a system, or a computer program product. Therefore, the present disclosure may adopt a form of a complete hardware embodiment, a complete software embodiment, or an embodiment combining software and hardware. In addition, the present disclosure may adopt a form of a computer program product implemented on one or more computer-usable storage media (including but not limited to disk storage, a Compact Disc Read-Only Memory (CD-ROM), optical storage, etc.) including computer-usable program codes.

The embodiments of the present disclosure are described with reference to flowcharts and/or block diagrams of the method, the device (system), and the computer program product according to the embodiments of the present disclosure. It should be understood that, each process and/or block in the flowcharts and/or block diagrams, and a combination of processes and/or blocks in the flowcharts and/or block diagrams can be executed by computer program instructions. These computer program instructions can be provided to a processor of a general-purpose computer, a special-purpose computer, an embedded processor, or other programmable data processing terminal device to generate a machine, such that instructions executed by the processor of the computer or other programmable data processing terminal devices generate an apparatus for implementing functions specified in one or more processes in the flowchart and/or one or more blocks in the block diagram.

These computer program instructions can also be stored in a computer-readable memory that can guide a computer or other programmable data processing terminal devices to work in a specific manner, such that instructions stored in the computer-readable memory produce an article of manufacture including an instruction device. The instruction device implements functions specified in one or more processes in the flowchart and/or one or more blocks in the block diagram.

These computer program instructions can also be loaded on a computer or other programmable data processing terminal devices to enable a series of operation steps to be executed on the computer or other programmable terminal devices for producing computer-implemented processing, such that instructions executed on the computer or other programmable terminal devices provide steps for implementing functions specified in one or more processes in the flowchart and/or one or more blocks in the block diagram. The above description merely illustrates preferred embodiments of the present disclosure, but is not intended to limit the protection scope of the present disclosure.

INDUSTRIAL APPLICABILITY

In the hand pose estimation method provided by the embodiments of the present disclosure, the hand pose estimation apparatus can: obtain the feature map corresponding to a hand depth image; input the feature map into an image feature extraction network to obtain an image information set feature map corresponding to the hand depth image; up-sample the image information set feature map to obtain the target resolution feature map; input the target resolution feature map into the predetermined depth classification network to obtain depth maps corresponding to hand key points in the hand depth image, in which the predetermined depth classification network is configured to distinguish the hand key points of different depths; and determine, based on the depth maps, depth values corresponding to the hand key points to perform hand pose estimation. Thus, in the present disclosure, after the hand feature map is obtained, the hand pose estimation apparatus can obtain deeper image information and increase an image resolution through the feature extraction and the image up-sampling processing, and the hand pose estimation apparatus can input the obtained target resolution feature map into the predetermined depth classification network to obtain the depth maps corresponding to the hand key points. That is, the hand key points are classified based on the depth intervals, and thus the depth values corresponding to the hand key points can be determined based on the depth maps, thereby achieving the hand pose estimation based on the depth values. It can be seen that, the hand pose estimation apparatus of the present disclosure can perform an accurate and efficient hand pose depth estimation, thereby achieving the high-precision hand pose estimation.

What is claimed is:

1. A hand pose estimation method using an image feature extraction network and a predetermined depth classification network, the method applied in an electronic device and comprising:
   obtaining, by a ROIAlign feature extractor, a feature map corresponding to a hand depth image;
   inputting the feature map into the image feature extraction network to obtain an image information set feature map corresponding to the hand depth image;
   up-sampling, by an up-sampler, the image information set feature map to obtain a target resolution feature map;
   inputting the target resolution feature map into the predetermined depth classification network to obtain depth maps corresponding to hand key points in the hand depth image, wherein the predetermined depth classification network is configured to distinguish hand key points of different depths;
   determining, based on the depth maps, depth values corresponding to the hand key points; and
   performing, based on the determined depth values corresponding to the hand key point, hand pose estimation.

2. The method according to claim 1, wherein the image feature extraction network comprises a first dimensionality reduction network and a deep convolutional network.

3. The method according to claim 2, wherein said inputting the feature map into the image feature extraction network to obtain the image information set feature map corresponding to the hand depth image comprises:
   inputting the feature map into the first dimensionality reduction network to obtain a first dimensionality-reduced feature map; and
   inputting the first dimensionality-reduced feature map into the deep convolutional network to obtain the image information set feature map.

4. The method according to claim 1, further comprising, prior to said obtaining the feature map corresponding to the hand depth image:
   obtaining an initial depth image comprising a target hand;
   performing a hand detection processing on the initial depth image to obtain the hand depth image corresponding to the target hand; and
   performing, by a feature extractor, a feature extraction on the hand depth image to obtain the feature map.

5. The method according to claim 1, further comprising, prior to said inputting the target resolution feature map into the predetermined depth classification network to obtain the depth maps corresponding to the hand key points in the hand depth image:
   obtaining a predetermined number N of the hand key points, a predetermined reference depth value, and a category K corresponding to the predetermined reference depth value, where N is an integer greater than 1, and K is an integer greater than 1 and smaller than N; and
   establishing a second dimensionality reduction network based on N and K.

6. The method according to claim 5, wherein the predetermined depth classification network comprises the second dimensionality reduction network and a predetermined probability computation model, and wherein said inputting the target resolution feature map into the predetermined depth classification network to obtain the depth maps corresponding to the hand key points in the hand depth image comprises:
   inputting the target resolution feature map into the second dimensionality reduction network to obtain a second dimensionality-reduced feature map;
   performing, based on N and K predetermined reference depth values, a classification and recombination processing on the second dimensionality-reduced feature map to obtain K×N key point feature maps;
   inputting the K×N key point feature maps into the predetermined probability computation model to obtain K×N groups of depth probability values corresponding to the K×N key point feature maps; and
   generating, based on the K×N groups of depth probability values and the K predetermined reference depth values, N depth maps corresponding to N hand key points.

7. The method according to claim 6, wherein said generating, based on the K×N groups of depth probability values and the K predetermined reference depth values, the N depth maps corresponding to the N hand key points comprises:
    performing, for each hand key point of the N hand key points, a weighted summation operation processing on K groups of depth probability values corresponding to the hand key point and the K predetermined reference depth values, to obtain N groups of weighted sum values corresponding to the N hand key points; and
    generating the N depth maps based on the N groups of weighted sum values.

8. The method according to claim 7, wherein said determining, based on the depth maps, the depth values corresponding to the hand key points comprises:
    obtaining N UV probability maps corresponding to the N hand key points; and
    determining, based on the N UV probability maps and the N depth maps, N depth values.

9. The method according to claim 8, wherein said determining, based on the N UV probability maps and the N depth maps, the N depth values corresponding to the N hand key points comprises:
    obtaining, for the N UV probability maps, N groups of UV probability values corresponding to N predetermined grids;
    performing, based on the N predetermined grids, an elementwise-multiply processing on the N groups of UV probability values and the N groups of weighted sum values, to obtain N groups of discrete depth values, wherein the weighted sum values correspond to the UV probability values in one-to-one correspondence; and
    performing a summation operation on each group of the N groups of discrete depth values to obtain the N depth values.

10. A non-transitory computer-readable storage medium, having a program stored thereon and applied in a hand pose estimation apparatus, wherein the program, when executed by a processor, implements the method according to claim 1.

11. A hand pose estimation apparatus using an image feature extraction network and a predetermined depth classification network, the apparatus comprising:
    a processor; and
    a memory having instructions stored thereon and executable by the processor,
    wherein the instructions, when executed by the processor, implement a hand pose estimation method comprising:
    obtaining, by the processor, a feature map corresponding to a hand depth image;
    inputting, by the processor, the feature map into the image feature extraction network to obtain an image information set feature map corresponding to the hand depth image;
    up-sampling, by the processor, the image information set feature map to obtain a target resolution feature map;
    inputting, by the processor, the target resolution feature map into the predetermined depth classification network to obtain depth maps corresponding to hand key points in the hand depth image, wherein the predetermined depth classification network is configured to distinguish hand key points of different depths;
    determining, based on the depth maps, depth values corresponding to the hand key points to perform hand pose estimation; and
    performing, based on the determined depth values corresponding to the hand key point, hand pose estimation.

12. The apparatus according to claim 11, wherein the image feature extraction network comprises a first dimensionality reduction network and a deep convolutional network.

13. The apparatus according to claim 12, wherein the instructions, when executed by the processor, implement:
    inputting the feature map into the first dimensionality reduction network to obtain a first dimensionality-reduced feature map; and
    inputting the first dimensionality-reduced feature map into the deep convolutional network to obtain the image information set feature map.

14. The apparatus according to claim 11, wherein the instructions, when executed by the processor, implement:
    obtaining an initial depth image comprising a target hand;
    performing a hand detection processing on the initial depth image to obtain the hand depth image corresponding to the target hand; and
    performing, by a feature extractor, a feature extraction on the hand depth image to obtain the feature map.

15. The apparatus according to claim 11, wherein the instructions, when executed by the processor, implement:
    obtaining a predetermined number N of the hand key points, a predetermined reference depth value, and a category K corresponding to the predetermined reference depth value, where N is an integer greater than 1, and K is an integer greater than 1 and smaller than N; and
    establishing a second dimensionality reduction network based on N and K.

16. The apparatus according to claim 15, wherein the instructions, when executed by the processor, implement:
    inputting the target resolution feature map into the second dimensionality reduction network to obtain a second dimensionality-reduced feature map;
    performing, based on N and K predetermined reference depth values, a classification and recombination processing on the second dimensionality-reduced feature map to obtain K×N key point feature maps;
    inputting the K×N key point feature maps into the predetermined probability computation model to obtain K×N groups of depth probability values corresponding to the K×N key point feature maps; and
    generating, based on the K×N groups of depth probability values and the K predetermined reference depth values, N depth maps corresponding to N hand key points.

17. The apparatus according to claim 16, wherein the instructions, when executed by the processor, implement:
    performing, for each hand key point of the N hand key points, a weighted summation operation processing on K groups of depth probability values corresponding to the hand key point and the K predetermined reference depth values, to obtain N groups of weighted sum values corresponding to the N hand key points; and
    generating the N depth maps based on the N groups of weighted sum values.

18. The apparatus according to claim 17, wherein the instructions, when executed by the processor, implement:
    obtaining N UV probability maps corresponding to the N hand key points; and
    determining, based on the N UV probability maps and the N depth maps, N depth values.

19. The apparatus according to claim 18, wherein the instructions, when executed by the processor, implement:
    obtaining, for the N UV probability maps, N groups of UV probability values corresponding to N predetermined grids;

performing, based on the N predetermined grids, an elementwise-multiply processing on the N groups of UV probability values and the N groups of weighted sum values, to obtain N groups of discrete depth values, wherein the weighted sum values correspond to the UV probability values in one-to-one correspondence; and performing a summation operation on each group of the N groups of discrete depth values to obtain the N depth values.

* * * * *